United States Patent [19]

Jay et al.

[11] 4,019,996

[45] Apr. 26, 1977

[54] DIELECTRIC COMPOSITIONS

[75] Inventors: Pierre Jay, St.-Didier du Mont d'Or; Ghislain Schwachhofer, Miribel, both of France

[73] Assignee: Rhone-Poulenc Industries, Paris, France

[22] Filed: July 7, 1975

[21] Appl. No.: 593,304

[30] Foreign Application Priority Data

July 16, 1974 France .................... 74.25788
Dec. 3, 1974 France .................... 74.40725
May 28, 1975 France .................... 75.17209

[52] U.S. Cl. .................... 252/63.7; 252/50; 252/51.5 R; 174/17 LF; 336/94; 361/301; 252/77; 252/64

[51] Int. Cl.² .................... H01B 3/18; H01B 3/22
[58] Field of Search ............ 252/63.7, 50, 51.5 R; 174/17 LF; 336/94; 317/258

[56] References Cited

UNITED STATES PATENTS 2,945,164   7/1960   Taylor .................... 317/230

FOREIGN PATENTS OR APPLICATIONS 988,922   9/1951   France

*Primary Examiner*—John D. Welsh
*Attorney, Agent, or Firm*—Bacon & Thomas

[57] ABSTRACT

Liquid dielectric compositions useful as electrical insulators are comprised of [1] a liquid dielectric component of known type, in combination with [2] at least one member selected from the group consisting of monocyanophenoxybenzene, monocyanodiphenyl and monocyanoterphenyl.

11 Claims, 3 Drawing Figures

DIELECTRIC COMPOSITIONS

BACKGROUND OF THE INVENTION

1. Field of the Invention

The present invention relates to novel liquid dielectric compositions and, more particularly, to liquid dielectrics comprising [1] a liquid dielectric component of a type known to be useful for its electrical insulation properties, in combination with [2] at least one member selected from the group consisting of monocyanophenoxybenzene, monocyanodiphenyl and monocyanoterphenyl. These liquid dielectric compositions find use as insulators of electrical equipment generally, especially of transformers and capacitors.

2. Description of the Prior Art

The prior art recognizes various dielectric materials to be used, for example, as insulation for electrical equipment. The primary characteristics considered essential to the proper functioning of such dielectrics include high permittivity, low initial conductivity, good thermal stability, e.g., a high resistance to thermal decomposition upon aging, low vapor pressure, low freezing point, and the like. Many materials have heretofore been employed as dielectric liquids, either alone or in admixture, and include mineral oil, chlorinated diphenyl, certain esters of organic acids, castor oil, aromatic hydrocarbons and the alkylates thereof, and the like. These compounds and compositions have been found to display the necessary characteristics permitting their use as electrical insulators. Few of such compounds and/or compositions, however, exhibit the aforesaid requisite properties while at the same time permitting individual parameter optimizations thereof. For example, those dielectric liquids which are known to the art and which possess the requisite properties of low conductivity and/or thermal stability or resistance to thermal degradation, have generally been found to display a permittivity which is too low, at least for certain applications.

SUMMARY OF THE INVENTION

It has now been found that certain compositions are especially well adopted to permit of an increase in permittivity of the known dielectric liquids without adversely affecting, e.g., the thermal stability thereof. According to the invention, it has now been determined that certain monocyano derivatives of certain aromatic compounds are well suited for use as constituents of dielectric compositions. More particularly, monocyanophenoxybenzene, monocyanodiphenyl and monocyanoterphenyl have been found to be especially well suited.

DETAILED DESCRIPTION OF THE INVENTION

Figure 1:
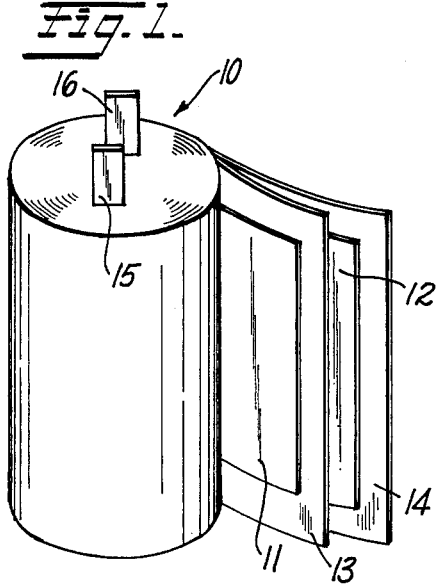
FIG. 1 is a top perspective view of a capacitor which can be insulated according to the invention.

As hereinbefore mentioned, monocyanophenoxybenzene, monocyanodiphenyl and monocyanoterphenyl have been found to be useful components of dielectric compositions according to the invention. Of the three monocyanophenoxybenzene isomers which can be utilized per the invention, most preferred is the 1-cyano-4-phenoxybenzene, a known compound, having a melting point of 45° to 47° C., and which isomer is capable of being supercooled. Further, the boiling point of 1-cyano-4-phenoxybenzene is 173° C. under 2 mm Hg, its dielectric constant is 15.0 at 26° C., and its vapor tension is low enough such as to permit of its use in the dielectric compositions according to the invention. 1-cyano-4-phenoxybenzene can be prepared, for example, by reacting cuprous cyanide with 1-bromo-4-phenoxybenzene, in pyridine, as described in the reference to J. M. Bonnier et al., "Bulletin de la Societe Chemique De France", pp. 1285–7 (1966).

Another known compound, 3-cyanodiphenyl, having a melting point of 43° to 45° C., also is suitable for use in the dielectric compositions according to this invention, whether alone or in admixture with any one and/or the other of its isomers 2-cyanodiphenyl or 4-cyanodiphenyl. However, the 2-cyanodiphenyl or 4-cyanodiphenyl, or mixtures thereof, are the preferred, especially by reason of the ease with which the same can conveniently be prepared and, thus, the description which follows shall essentially be confined to a description of said 2- and 4-isomers and the utilization thereof.

The isomers, 2-cyanodiphenyl and 4-cyanodiphenyl, can be prepared, for example, by reacting cuprous cyanide with either 2l-halodiphenyl or 4-halodiphenyl, or mixtures thereof, in a polar solvent. Other methods for the preparation of these particular compounds are described in the literature.

The 2-cyanodiphenyl has a melting point of 32° to 33° C., but generally can be supercooled. 2-Cyanodiphenyl has a density, $d_{21° c.}$, of 1.1, and its dielectric constant is 17.60 at 22° C. and 14.10 at 90° C. The 4-cyanodiphenyl has a melting point of 85° C., a density, $d_{90° c.}$, of 1.050, and a dielectric constant of 12.40 at 90° C. The vapor tension of both of these isomers, and any mixture thereof, is also sufficiently low as to permit their use as electrical equipment insulators according to the invention.

The monocyanoterphenyls comprise the ortho-, meta- and para-terphenyls, or mixtures thereof, and each is characterized as bearing a single nitrile function on but a single one of any of the three nuclei comprising the terphenyl molecule. Because these isomers are only difficultly separated into their individual isomeric components, typically the same are utilized in the form of any of their mixtures, which mixtures can either be resinous or crystalline. These isomers too are prepared, for example, by reacting cuprous cyanide with the monohaloterphenyls, in a polar solvent. A mixture of monocyanoterphenyls, thus, can be prepared as follows:

A terphenyl mixture, rich in the ortho- and meta-isomers, is first chlorinated and then distilled such as to isolate a fraction exhibiting a degree of chlorination equal to about 1.015 mols of chlorine per mol of terphenyl. The fraction thus recovered is next reacted with cuprous cyanide, at 200° C., for about 40 hours. Upon distillation, a mixture of monocyanoterphenyl isomers is recovered which is well suited for those insulation applications according to the invention, and which boils between about 180° and 200° C. under 1.2 mm Hg, and the dielectric constant of which is 11 at 90° C.

Thermal and chemical stability of the cyano compounds suitable for application according to the invention have been estimated by comparing changes in conductivity over a prolonged period of time. For this purpose, a liquid composition was prepared by dissolving the topic cyano compounds in an eutectic mixture of diphenyl and terphenyls, and exposing such composition to the effects of heat (150° C.), under a nitrogen atmosphere, and over a prolonged period of time. Losses in dielectric properties were periodically measured (tg δ) under 50 Hertz. The eutectic diphenyl/terphenyls is not the most preferred as a typical dielectric impregnant, but same is indeed most interesting from the point of view of a survey on the stability of the various additives, for the eutectic is and of itself very stable and, consequently, has no deleterious effect on the results obtained.

The following three compositions according to the invention were prepared, and their thermal and chemical stabilities investigated as immediately above described:

| Composition A | |
|---|---|
| 1-Cyano-4-phenoxybenzene | 25% by weight |
| Eutectic diphenyl/terphenyls | 75% by weight |
| Dielectric constant ε at 90° C. | 5.00 |

| Composition B | |
|---|---|
| Mixture of isomers of monocyanodiphenyl | 28% by weight |
| [ortho isomer 9.6% by weight] [para isomer 90.4% by weight] | |
| Eutectic diphenyl/terphenyls | 72% by weight |
| Dielectric constant ε at 90° C. | 5.03 |

| Composition C | |
|---|---|
| 2-Cyanodiphenyl | 25% by weight |
| Eutectic diphenyl/terphenyls | 75% by weight |
| Dielectric constant ε at 90° C. | 5.02 |

The results obtained conducting the aforesaid tests are reported in the following Table I.

TABLE I

| Time in hours | Tg δ Composition A | Tg δ Composition B | Tg δ Composition C |
|---|---|---|---|
| 0 | 6.4 | 5.8 | 4.9 |
| 1 | — | 4.7 | — |
| 2 | — | — | 11.5 |
| 16 | 7.5 | 12 | — |
| 25 | — | 12 | — |
| 41 | — | 14 | — |
| 65 | 9 | 15.5 | 16.8 |
| 89 | — | 17 | — |
| 114 | — | — | 18 |
| 136 | 11.4 | — | — |
| 161 | — | 22 | 24 |
| 185 | — | 23 | — |
| 233 | 16.4 | 32 | 34 |
| 282 | — | — | 41 |
| 304 | 47 | — | — |
| 330 | — | 38 | 50 |
| 352 | 50 | — | — |
| 377 | — | 36 | — |

The above data clearly demonstrate that the subject compositions are characterized by marked thermal stability, especially in the light of the fact that the tests were conducted under temperatures higher than those normally encountered during practical applications.

As hereinbefore mentioned, the various monocyano compounds according to the invention are utilized in combination with the liquid dielectrics of known insulating type, representative of which being, for example, mineral oil, castor oil, chlorodiphenyls, the aromatic hydrocarbons and alkylates thereof, esters of organic acids such as those esters having aromatic basic nuclei, aliphatic esters, especially 2-ethyl-hexyl-2-ethylhexanoate, as disclosed in French patent application, Ser. No. 74/29459, filed Aug. 22, 1974, assigned to the assignee hereof and hereby expressly incorporated by reference. Especially preferred according to the invention are those compositions comprising, in addition to the monocyano component, dielectric liquids of known type which in and of themselves possess a low dielectric constant. In any event, the overall or resultant permittivity of the mixtures can conveniently be adjusted to any required level, as a result of the admixture with dielectric liquids which themselves possess a relatively high permittivity. The amount of the monocyano compound to be admixed according to the invention can vary over wide limits and, in reality, is but a function of the ultimate value selected to be the resultant permittivity of the final compositions. Generally, however, the amount of monocyano compound added comprises between about 3 and 50% by weight of said final compositions. Thus, one is able to formulate an entire series of dielectric impregnants meeting the numerous requirements for any given application.

When employing a mixture of the monocyano compounds to formulate the subject liquid dielectric compositions, selection therebetween will depend upon the relative solubilities of the various monocyano compounds in the dielectric liquids of known type. Nevertheless, a convenient and preferred formulation consists of the utilization of certain mixtures such as are obtained in the processing of raw materials deriving from specific industrial applications, for example, in the case of the monocyanodiphenyls, certain industrial mixtures of the 2-halo and 4-halodiphenyls.

The liquid dielectrics according to the invention are formulated by simple admixture of the various constituents thereof, at temperatures under which the monocyano compounds are in the liquid state, and such compositions are treated prior to use in the usual fashion for dielectrics of this type, e.g., by treatment with activated earth for purposes of, e.g., purification.

Optionally, the typical additives may also be included in the compositions of the invention, such as those usually added for purposes of lowering surface tension, e.g., the silicone oils; similarly with respect to such agents as antioxidants or purification agents, e.g., the epoxides typically employed for such use.

In order to further illustrate the present invention and the advantages thereof, the following specific examples are given, it being understood that the same are intended merely as illustrative and in no wise limitative.

EXAMPLE 1

The following dielectric admixture was formulated, with the percentage being by weight:

| | |
|---|---|
| Dichlorodiphenyl fraction containing 75% by weight of the 2,4-isomer | 64% |
| Eutectic mixture diphenyl/terphenyls | 31% |
| 1-Cyano-4-phenoxybenzene | 5% |

This liquid displayed a permittivity of 5.05 at 90° C. Upon standing for 500 hours at 150° C., its dielectric loss (tg δ) measured at the same temperature, under 50 Hertz, was 12%.

EXAMPLE 2

A mixture was prepared containing, by weight 75% of the diphenyl/terphenyls eutectic, and 25% of 1-cyano-4-phenoxybenzene. Its permittivity was 5.0 at 90° C. and the dielectric loss thereof was slight over a prolonged period of time.

EXAMPLE 3

A dielectric liquid was prepared having a permittivity of 5.0 at 90° C. by mixing dioctyl phthalate and 1-cyano-4-phenoxybenzene in the respective proportions of 92 and 8%, by weight.

EXAMPLE 4

The following dielectric admixture was formulated, the percentages being by weight:

| | |
|---|---|
| Dioctyl phthalate | 80% |
| Mixture of ortho- and para-monocyanodiphenyl containing 9.6% of ortho- and 90.4% of para-. | 20% |

The resulting composition had a viscosity of 9.6 centistokes at 60° C., of 4.6 centistokes at 90° C. and a dielectric constant of 6.16 at 90° C. Upon aging for 500 hours at 150° C., under nitrogen, dielectric loss (tg δ) at 150° C. and under 50 Hz became stable at 98%, which represents a stability sufficient for practical applications.

EXAMPLE 5

The following dielectric admixture was formulated, the percentages being by weight:

| | |
|---|---|
| Diisobutyl phthalate | 80% |
| Mixture of ortho- and para-monocyanodiphenyl (9.6% ortho-, and 90.4% of para-) | 20% |

This composition had a viscosity of 6.85 centistokes at 60° C. and a dielectric constant of 7.26 at 90° C.

EXAMPLE 6

The following dielectric admixture was formulated, the percentages being by weight:

| | |
|---|---|
| 2-Ethylhexyl-2-ethylhexanoate | 80% |
| Ortho-monocyanodiphenyl | 20% |

This composition had a viscosity of 1.34 centistokes at 90° C. and a dielectric constant of 4.71 at 90° C.

EXAMPLE 7

The following dielectric admixture was formulated, the percentages being by weight:

| | |
|---|---|
| Eutectic diphenyl/terphenyls | 70% |
| Monocyanoterphenyls, isomeric mixture | 30% |

This composition had a viscosity of 5 centistokes at 90° C., a dielectric constant of 4.8 at 90° C, and a tangent δ at the instant $t = 0$ at 150° C., under 50 Hz, equal to 8%.

Referring specifically to the figures of drawing, FIG. 1 depicts a component 10 of a capacitor, comprising two electrodes which are defined by the foils 11 and 12, which foils are made of aluminum or any other suitable material and which are shown as being separated by the two layers of insulation 13 and 14. These insulating layers 13 and 14 can either be paper foil, or, alternatively, same can be films of the various plastics or the various composites known and similarly used in the art, for example, a pair of polyolefin foils with a layer of paper sandwiched therebetween. The elements 15 and 16 define strips utilized for establishing electrical contact.

Figure 2:
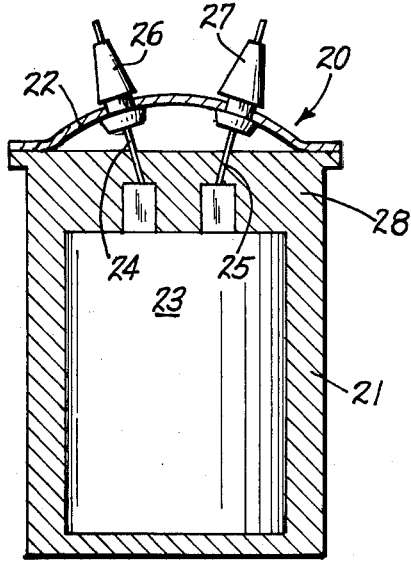
FIG. 2 is a vertical cross-section of a capacitor which has been insulated according to the invention.

FIG. 2 of the drawing, a vertical cross-section of a capacitor 20, includes a metallic housing 21 with a cover 22 therefor ensuring a tight fit, a capacitor component 23 of the type illustrated in the FIG. 1, and connectors 24 and 25 joining the bobbin plates to the outer bushings 26 and 27. The condenser tank is filled with the dielectric composition of Example 1 such that the liquid fully impregnates all dielectric material and concomitantly fills all voids and interstices within the apparatus.

Figure 3:
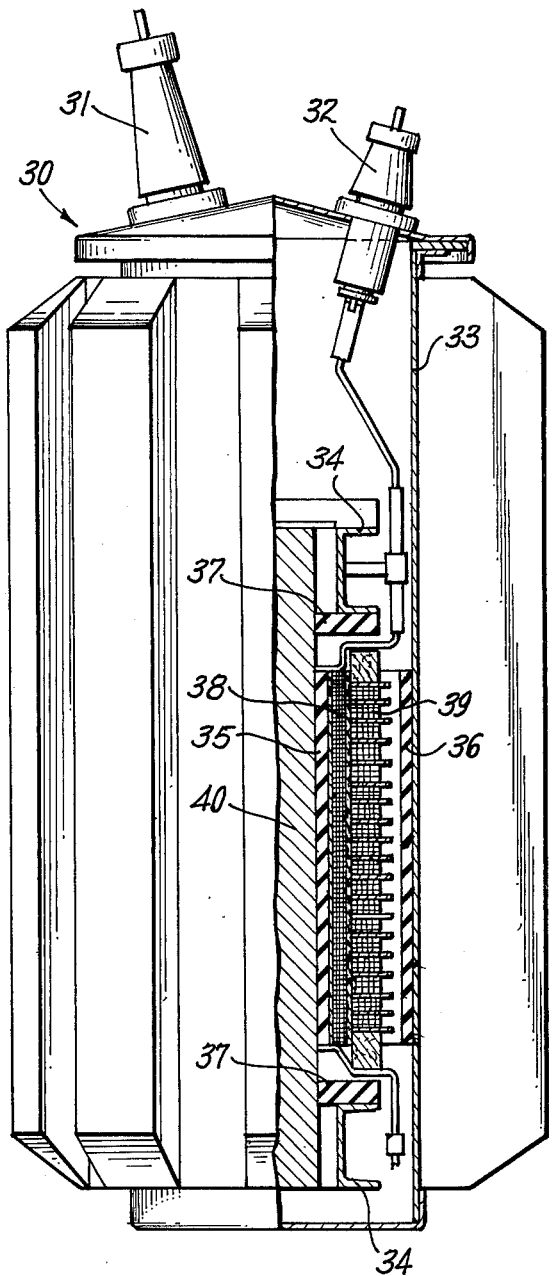
FIG. 3 is a vertical cross-section, partly in elevation, of a transformer which has been insulated according to the invention.

In FIG. 3 there is illustrated a transformer 30 including a high voltage bushing 31, and low voltage bushing 32, a transformer casing 33, pressure flanges 34, and insulating barriers 35 and 36 which, on the one hand, respectively separate the low voltage coil 38 from the iron core 40, and on the other separate the high voltage coil 39 from the casing. The strips 37 are insulating spacers, and the conductors of the low voltage and high voltage coils are suitably insulated with any solid dielectric material, such as paper. The transformer casing of FIG. 3 is filled with the composition of Example 6. This dielectric liquid fills all of the interspaces in the transformer and also fully impregnates both the coils and the various other elements of the apparatus.

It will also be appreciated that the dielectric liquids of the invention are useful as insulators for all types of electrical equipment, in general.

While the invention has now been described in terms of various preferred embodiments and illustrated with respct to certain examples, it will be apparent to the skilled artisan that various omissions, substitutions, modifications and the like may be made without departing from the spirit of the invention. Accordingly, it is intended that the scope of the present invention be limited only by the following claims.

What is claimed is:

1. A dielectric composition comprising a liquid dielectric component selected from the group consisting of mineral oil, castor oil, chlorodiphenyls, aromatic hydrocarbons and alkylates thereof, and esters of organic acids and containing an effective amount of at least one member selected from the group consisting of monocyanophenoxybenzene, monocyanodiphenyl and monocyanoterphenyl to impart the desired permittivity characteristic to said dielectric composition.

2. The composition as defined by claim 1, wherein the said second dielectric component comprises from about 3 percent to 50 percent thereof.

3. The composition as defined by claim 1, wherein the said second dielectric component is monocyanophenoxybenzene.

4. The composition as defined by claim 1, wherein the said second dielectric component is monocyanodiphenyl.

5. The composition as defined by claim 1, wherein the said second dielectric component is monocyanoterphenyl.

6. The composition as defined by claim 1, wherein the said second dielectric component is a mixture of the isomers, 2-cyanodiphenyl and 4-cyanodiphenyl.

7. The composition as defined by claim 1, wherein the said second dielectric component is a mixture of the isomeric monocyanoterphenyls.

8. The composition as defined by claim 1, further including a member selected from the group consisting of a surfactant, an antioxidant and a purifying agent.

9. In an insulated electrical component, the improvement which comprises insulation material including the dielectric composition as defined by claim 1.

10. The insulated electrical component as defined by claim 9, comprising an insulated capacitor.

11. The insulated electrical component as defined by claim 9 comprising an insulated transformer.

* * * * *